Figure 2:
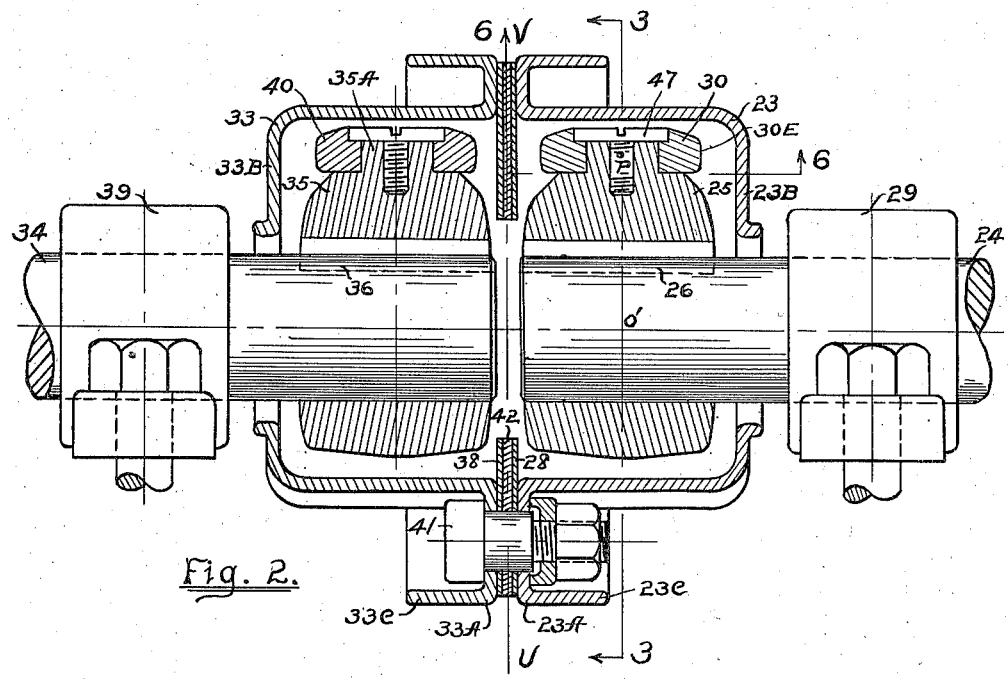

Aug. 2, 1938.    J. W. KITTREDGE    2,125,615
FLEXIBLE COUPLING FOR SHAFTING
Filed Aug. 2, 1935    3 Sheets-Sheet 1

Fig. 1ᴬ.

Inventor.
John W. Kittredge

Aug. 2, 1938.   J. W. KITTREDGE   2,125,615
FLEXIBLE COUPLING FOR SHAFTING
Filed Aug. 2, 1935   3 Sheets-Sheet 2
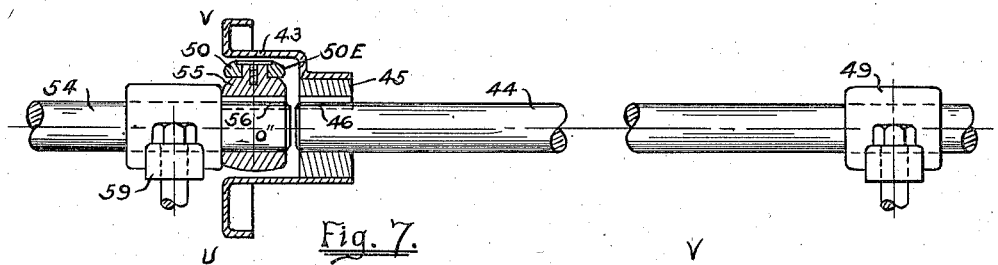
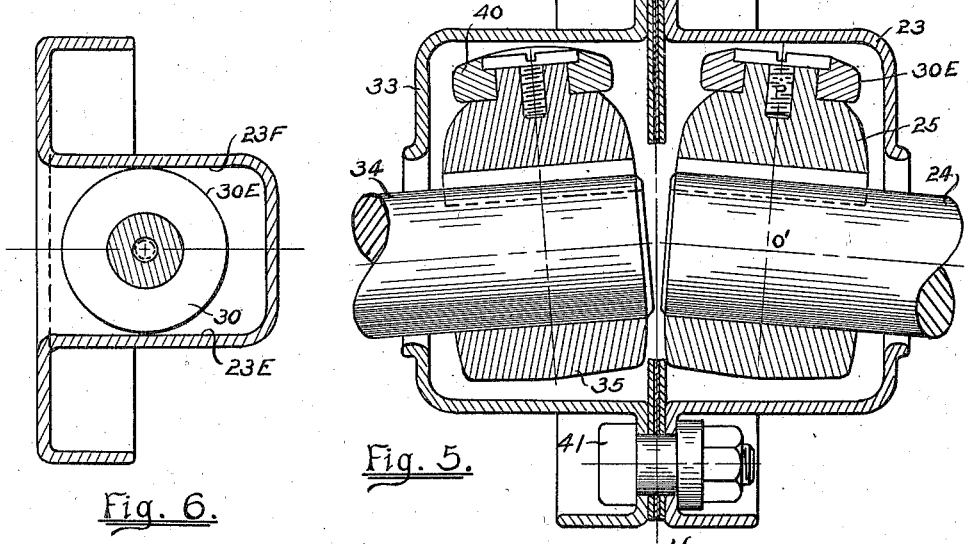
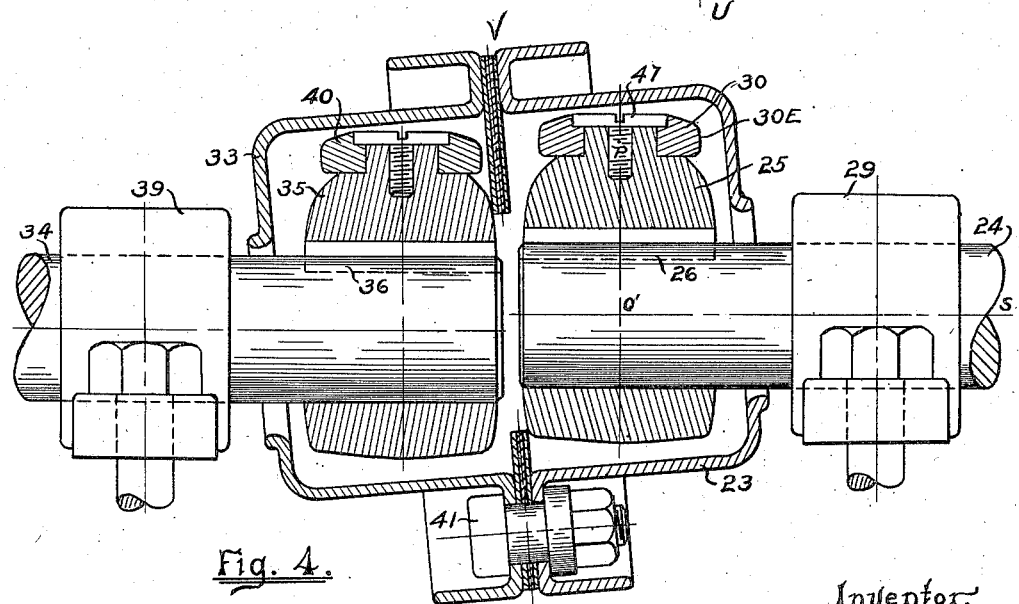
Inventor:
John W. Kittredge

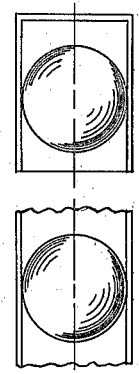
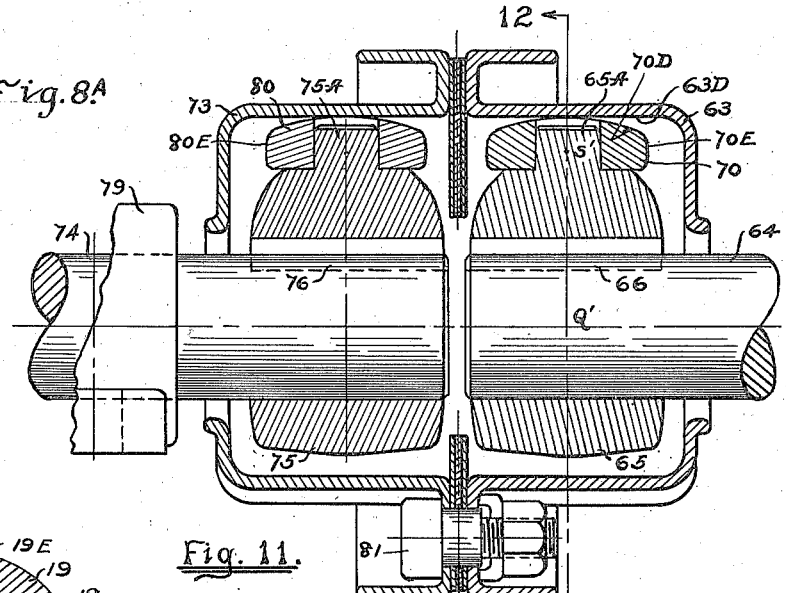
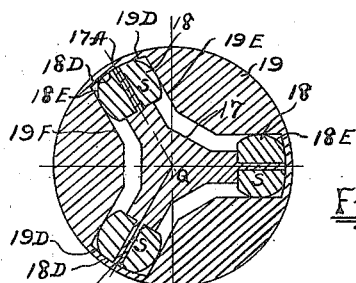
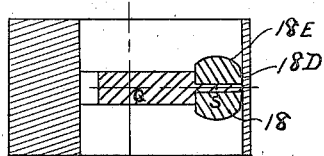
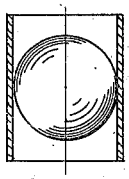
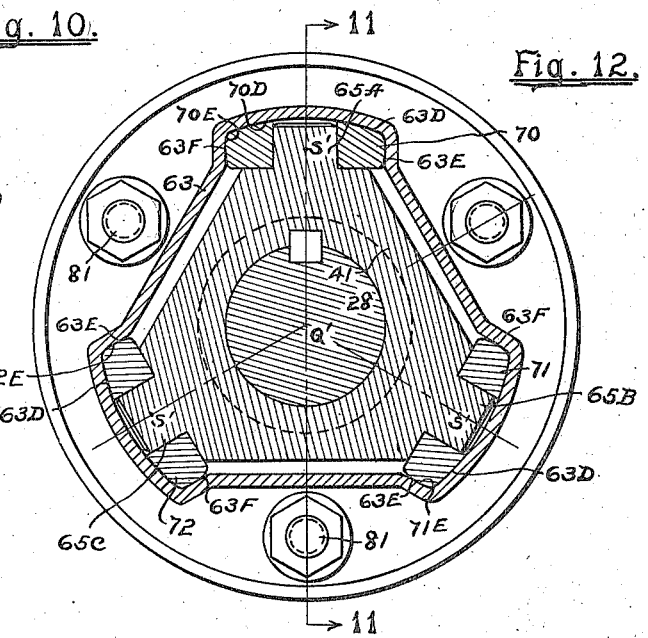

Patented Aug. 2, 1938

2,125,615

UNITED STATES PATENT OFFICE 2,125,615

FLEXIBLE COUPLING FOR SHAFTING

John W. Kittredge, Akron, Ohio

Application August 2, 1935, Serial No. 34,463

9 Claims. (Cl. 64—7)

It is well known that, due to defective workmanship, settling of foundations, or other causes, shafts to be coupled are frequently not in true alignment; also that on make over and repair jobs it sometimes facilitates the work greatly to set the shafts a little out of line. In such cases, the coupled shafts are at an angle with each other; or if parallel they are offset and not in the same straight line; or they are both off-set and non-parallel. If such shafts be rigidly coupled, they produce objectionable strains and vibrations, especially at high speeds. Also with electric motors especially, a shaft has a certain endwise motion. And many couplings transmitting power through flexible materials or otherwise have been devised to compensate for the various motions of the shafts relative to each other. My coupling is to correct such misalignment and endwise motions, and its objects are:

1st. To transmit power through strong members which may be of non-resilient material with no yielding or flexible materials in the transmitting mechanism, and thus to make a coupling that is powerful and durable.

2nd. To provide a rigid float member hinged to the shaft ends, with drive connections through the hinges; to have the hinges yieldable in all directions through considerable angles, and also in longitudinal direction, and to have them fit closely through the several positions of yield and not depend on clearance or backlash. To have them thus hold the float member closely to position at all times, running forward or back, idly or under load, and still to compensate greater misalignment, angular or off-set or both, than can be done by couplings now in use.

3rd. To have the float in two parts joined at the shaft ends; to have each part of thin metal of approximately uniform thickness to attain lightness; to have each part a single sheet of metal bent into walls and angles to attain strength; and to have them adapted to die forming.

4th. To have forces balanced so as to produce a turning moment only, with a minimum of transverse pressure on the shafts or their bearings, thus eliminating friction, preventing wear and economizing power.

5th. To have the movements accomplished by rolling friction, with a minimum of sliding friction under pressure, thus further preventing wear and economizing power.

6th. To transmit rotary motion uniformly from shaft to shaft, with little or no acceleration or retardation.

7th. To have the shafts nearly end to end and thus to economize room.

8th. To provide means for lubrication.

9th. To have the coupling simple and cheap, and easily set up and dismantled.

I attain these objects by the mechanism shown in the accompanying drawings, in which,—

Figure 3:
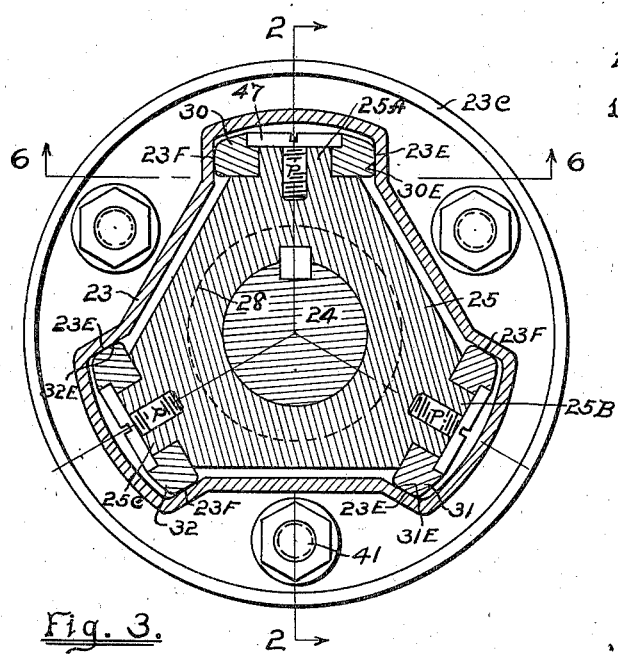
Figure 1:
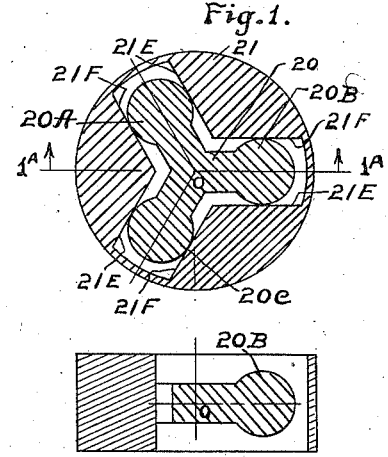

Figs. 1 and 1A, diagrammatic, show a spider with three spheres, nearly or quite 120 degrees apart, each sphere fitting closely between parallel planes. Fig. 2 is a longitudinal section of my coupling with shafts and bearings in alignment, and is taken on line 2—2 of Fig. 3. Fig. 3 is a cross section of same taken on line 3—3 of Fig. 2. Fig. 4 is a longitudinal section similar to Fig. 2, but with the shafts in off-set parallel misalignment, and with adjacent bearings holding them so. Fig. 5 is a similar longitudinal section, but with the shafts in angular misalignment, and supposed to be so held by adjacent bearings similar to Figs. 2 and 4. Fig. 6 is a longitudinal section on lines 6—6 of Figs. 2 and 3. Fig. 7 is a longitudinal section showing an embodiment of my coupling with one bearing adjacent and one remote. Fig. 8, diagrammatic, shows a sphere fitting between parallel planes, said planes fixed relatively to each other. Fig. 9, diagrammatic, shows a sphere fitting within a cylinder. Figs. 10 and 10A, also diagrammatic, show a spider with three partial spheres fitting between parallel planes similar to Fig. 1, but with differences hereinafter pointed out. Figs. 11 and 12 show a slightly different embodiment of my coupling from that hereinbefore illustrated. Fig. 11 is a longitudinal section on line 11—11 of Fig. 12, and Fig. 12 is a cross section on line 12—12 of Fig. 11.

A given part carries the same number throughout the several views. For clearness of description, a given part is designated by a numeral, as 23, and different edges or faces of that part by that numeral with letters as 23A, 23B, 23C, etc.

Referring to Fig. 8; if two parallel planes are fixed with reference to each other and a sphere fits accurately between them, it is evident that the sphere fits however it may be turned or however the planes may be turned. In Fig. 1, let 21 be a cylinder and 21E and 21F be three pairs of parallel planes therein. Let 20 be a spider with axis coinciding with the axis of cylinder 21 and, for the moment, suppose that axis vertical. And let 20A, 20B and 20C be three spheres, each fitting closely between its pair of parallel planes. Now tilt the spider in any direction; the three spheres still fit closely between their respective planes, as can be demonstrated by experiment. With the cylinder stationary, the center O of the spider moves slightly in horizontal direction as the spider tilts. But the three spheres fitting closely between their parallel planes hold the center O to a fixed horizontal position for any given angle of tilt.

Conversely, if the spider is stationary with its axis vertical and the cylinder tilts, the center of the cylinder moves slightly in horizontal direction. But the three spheres fitting closely between their parallel planes hold it to a fixed horizontal position for any given angle of tilt.

These are the movements embodied in my coupling.

If the spider had four or more arms, it could not tilt in all directions; it would cramp and bind. If it had two arms only, it could slide longitudinally of the arms, and would not hold the center O to a given horizontal position for a given angle of tilt.

In Figs. 2 and 3, let 24 be the driving shaft. Flange or hub 25 is fixed rigidly to it as by key 26. Flange 25 has three axles 25A, 25B and 25C, and they carry rollers 30, 31 and 32 held to place as by screws 47. Enclosing the shaft end, the flange and rollers, is casing 23. Driven shaft 34 carries flange 35 fixed rigidly to it as by key 36. Flange 35 has three axles 35A and they carry three rollers 40. And enclosing them is casing 33, all entirely similar to the corresponding parts just described. Transverse walls 23A and 33A enable the two casings to be bolted securely together by three bolts 41 with gaskets 28 and 38 between. Transverse walls 23B and 33B make the casing in chamber form with openings around the shafts. Each casing is preferably a single thin sheet of metal bent angling with walls in different directions as shown. This makes it light, a desirable quality for a floating member. Its shape gives it great strength analogous to structural steel. And it is adapted to stamping or die forming. Chamber shaped, it can be partially filled with grease and, when running, centrifugal force throws the grease out around the rollers. Guards 23C and 33C cover the bolts and give a circular exterior.

As shaft 24 drives, the three rollers 30, 31 and 32 press against the three faces 23E or 23F, according to the direction of rotation, and thereby drive the casing. On the driven side, the casing drives the rollers 40, the flange 35 and the shaft 34.

The edge of each roller 30E is a segment of a sphere with center P. The casing walls engaging these edges are straight for short distances, so that each roller fits between two parallel planes 23E and 23F, entirely similar to Fig. 1. The rollers have only enough clearance between said parallel planes to allow them to turn on one plane or the other, according as they press against 23E or 23F.

Fig. 4 shows O', the center of shaft 24 and flange 25, to be fixed in position by bearing 29, but with the casing tilted with reference to the flange. This is exactly the same case as above considered with the simpler figure, Fig. 1, except that here the casing is approximately horizontal. Its position is controlled by the pressure of the three roller edges 30E, 31E and 32E against the parallel planes 23E and 23F of Figs. 3 and 6.

As the shafts and coupling rotate with shafts misaligned as in Figs. 4 and 5, each roller approaches and recedes from the middle line U—V of the casing and, in so doing, turns on its axle. It rolls for a short distance on plane 23E or 23F according to the direction of rotation of the shafts, and therefore according to the direction of pressure of the roller against the one plane or the other.

Fig. 5 shows again the same case; the center O' of shaft 24 and flange 25 fixed in position, but the casing 23 tilted with reference to the flange. And here again the position of the casing is controlled by the engagement of the three roller edges 30E, 31E and 32E with the parallel planes 23E and 23F of the casing. Here again, as the shafts and coupling rotate, the rollers turn on their axles and roll for short distances toward and away from the center line U—V of the casing; rolling on plane 23E or 23F according to the direction of rotation of the shafts, and therefore according to the direction of pressure of the rollers. And as the shafts move endwise, the rollers also roll for short distances along said planes 23E and 23F.

Suppose the rollers and planes to be 120 degrees apart. The casing floats and compensates inaccuracies of workmanship and of alignment. It adjusts itself to the pressures of the three rollers on each flange so that they all drive at all times, even if badly misaligned, and moreover, so that they all drive with very nearly equal pressures. This exerts almost a true turning moment, with minimum transverse pressure on the shafts or their bearings. And this tends to eliminate friction, reduce wear and economize power. With four or more rollers on a flange, it would be possible for some of them to drive and others to run idly, or for them to cramp and bind.

Not only do the three rollers tend to equalize pressures and thereby eliminate pressure on the bearings, but they also tend to equalize velocity. The well known Hooke's coupling or universal joint has two driving pivots 180 degrees apart, and two driven pivots 180 degrees from each other and 90 degrees from the driving pivots. A driven pivot runs alternately faster and slower than a driving pivot. When one driven pivot is at maximum speed, the other driven pivot 180 degrees therefrom is at maximum speed also. When one driven pivot is at minimum speed, the other is also at minimum speed. That is, the two mechanisms 180 degrees apart function just alike. But the three mechanisms 120 degrees apart as herein described function differently. When one driven pivot is in the position corresponding to maximum speed of a Hooke's coupling, the other two driven pivots 120 degrees therefrom are in positions of less than mean average speed of a Hooke's coupling. That is, the three rollers 120 degrees apart tend to neutralize the irregularities and not accentuate them, and tend thereby to drive at uniform speed.

If the center O' of shaft and flange remains in fixed position, the corresponding point of the casing moves a short distance vertically as the casing tilts from the position of Fig. 2 to that of Fig. 4. With the rollers fitting perfectly between the planes, with O'—P equal 2.75 inches, and with the angle of tilt 4 deg. 30 min. the angle shown approximately in Figs. 4 and 5, then the movement of this point of the casing is about 0.004 of an inch. As this is scarcely more than the permissible error in good mechanical work, then for all practical purposes, the casing runs on its axis.

It will be evident from the figures that the shafts may run in either direction with either shaft the driver, and that the action is practically the same whether running idly or under load. The rollers may be non-metallic for light drives and metallic for heavy ones, but the flexibility of the coupling is entirely independent of the yield of its materials.

Between the gaskets 28 and 38, is a ring 42 of sheet metal preferably of the same inside and outside diameters as the gaskets. Should the casing tend to move longitudinally of the shafts, a soft gasket engages a flange. The adjacent metal ring gives strength, and the ring and gaskets limit the endwise movement, with cushion effect to prevent hammering.

In the event that one bearing is adjacent to the shaft ends and one is remote, a half coupling only is necessary; the half casing 43 being made rigid to a shaft end as through bushing 45 and key 46, as shown in Fig. 7. The action of the parts is the same as hereinbefore described. Obviously, this arrangement can be reversed; casing 43 and bushing 45 be put on the end of shaft 54 next the bearing 59, and flange 55 be put on the end of shaft 44. In that arrangement, flange 55 becomes the float.

In the matter of the embodiment of Figs. 11 and 12.—Referring again to Fig. 8, if two parallel planes are fixed relatively to each other and a sphere fits accurately between them, it is evident that it fits however the sphere is turned or however the planes are turned. Referring to Fig. 9, it is evident that if a sphere fits within a cylinder, it fits however the sphere is turned or however the cylinder is turned. Fig. 10, diagrammatic, combines these two movements. The spider 17 carries three rollers 18 on axles 17A. Each roller is a partial sphere with center S, and these spherical surfaces 18E fit accurately between parallel planes 19E and 19F of cylinder 19. The outer face 18D of each roller is a portion of a sphere with center Q, and it engages cylindrical surfaces 19D of cylinder 19. If the axes of the spider and the cylinder coincide and are vertical, the axis of the spider can then tilt in any direction and the three partial spheres, each fitting closely between its pair of parallel planes, hold the center of the spider to a given horizontal position for any given angle of tilt as hereinbefore described relatively to Fig. 1. Or they hold the center of the cylinder to a given horizontal position for any given angle of tilt, if the cylinder tilts with the spider stationary. At the same time, the spherical surfaces 18D can tilt within cylindrical surfaces 19D, just as in Fig. 9. These are the movements embraced in the embodiment of Figs. 11 and 12.

Shaft 64 carries flange 65 held rigidly to it as by key 66. Flange 65 has three axles 65A, 65B and 65C, and they carry rollers 70, 71 and 72. Enclosing the shaft end, flange and rollers, is half casing 63. The edges of the rollers 70E, 71E and 72E are segments of spheres with centers at S', and they fit closely between parallel planes 63E and 63F of the casing. Shaft 74 in bearing 79 carries flange 75 made fast to it as by key 76. Flange 75 has three axles 75A carrying three rollers 80. Half casing 73 bolted to half casing 63 by three bolts 81 enclose the parts, and spherical edges 80E of the rollers 80 fit closely between parallel planes in casing, all similar to the corresponding parts described in the previous embodiment. But the screws 47 of that embodiment are eliminated. The edges 70E of the rollers are segments of spheres with center S', as aforesaid, and their outer faces 70D are also segments of a sphere with center Q'. These faces 70D engage cylindrical faces 63D of casing 63, and they fit in all positions of tilt, exactly the same as with the simpler figures, Figs. 9 and 10. And the faces 63D hold the rollers to place. When running, centrifugal force tends to throw the rollers outward and they press against the cylindrical faces of the casing.

In the following claims, I use "flange" to mean any hub or power transmitting member such as is commonly keyed to a shaft; not necessarily keyed nor of the shape herein illustrated. The member which is free to float to adjust itself to the member in fixed bearings, I term a "float." It is understood that no material is absolutely rigid, inelastic or non-resilient. However, I use those terms to designate materials, either metallic or non-metallic, which are so nearly rigid and inelastic that the coupling must depend for its flexibility on other things, as pivots and rollers, and not on the yield of its materials. This in contrast to the many flexible couplings which actually depend for flexibility on the yield of materials such as soft rubber, leather, spring metal and the like. As hereinbefore described, these joints between flange and casing fit correctly in the various positions of bend; this in contrast to devices that do not fit correctly and depend on the flexibility of materials or on backlash between rigid members. By "closely fitting," "planes spaced apart the diameter of a roller," and like expressions, I mean fitting with clearance sufficient to permit the roller to turn, as hereinbefore explained. I mean, also, design and construction that is mechanically correct, and can be made and operated with no greater errors than those of good mechanical workmanship. But I mean those terms to be sufficiently broad that sloppy construction and ill-fitting members cannot evade my claims.

It will be understood that my invention may be made in various forms and styles, and that I do not limit myself to the embodiments herein shown nor by the theories herein expressed, but only by the following claims.

Having thus described my invention, I claim:

1. A shaft coupling comprising a member with fixed axis; a float member; three pairs of parallel planes on one of said members; three pivots on the other member; a roller on each pivot, each roller fitting between a pair of parallel planes and having a spherical bearing surface with diameter equal to the distance between said planes.

2. A shaft coupling comprising a flange; three pivots on said flange; a roller on each pivot, each roller having a spherical bearing surface; a casing; three pairs of parallel planes in said casing, each pair spaced apart the diameter of a roller; and each roller disposed between parallel planes.

3. A shaft coupling comprising a driving member; a driven member; three pivots on one of said members; a roller on each pivot, each roller having a spherical bearing surface; three pairs of parallel planes on the other member, said planes spaced apart the diameter of a said roller; a roller disposed between each pair of parallel planes; and means to hold said rollers from radial movement.

4. A shaft coupling comprising driving and driven members; three pairs of parallel planes approximately 120 degrees apart on one of said members; rollers spaced approximately 120 degrees apart on the other member, said rollers having spherical bearing surfaces and being in rolling engagement with the said planes.

5. A shaft coupling comprising driving and driven flanges; three driving pivots and three driven pivots on the respective flanges; three driving rollers and three driven rollers on the respective pivots, each roller having a spherical bearing surface; a casing, said casing formed into three longitudinal grooves, the width of each groove being equal to the diameter of a roller; and a driving roller and a driven roller positioned in each groove.

6. A shaft coupling comprising a casing; three pairs of parallel planes approximately 120 degrees apart in said casing; driving and driven flanges; driving and driven rollers spaced approximately 120 degrees apart on the respective flanges, each roller having a spherical bearing surface; and said driving and driven rollers in rolling engagement with said planes.

7. A shaft coupling comprising a casing adapted to rotate about a central axis; three walls in said casing equidistant from said axis of rotation and parallel thereto; three pairs of walls in said casing arranged approximately 120 degrees apart around said axis of rotation, each pair being parallel to said axis and parallel to each other; walls in said casing transverse to said axis of rotation and connecting the walls aforesaid; and said casing being of sheet metal adapted to die forming; a shaft; a flange on the end of said shaft; three pivots on said flange; a roller on each pivot, each roller disposed between parallel walls aforesaid and having a spherical bearing surface with diameter equal to the distance between said parallel walls; and each roller having also a spherical outer surface with its center on said axis of rotation, and having said spherical surface in engagement with a wall first aforesaid.

8. A shaft coupling comprising a casing, said casing being symmetrical about a central axis; three longitudinal grooves in said casing; an outwardly projecting transverse wall at one end of said casing, and an inwardly projecting transverse wall at the opposite end thereof, said casing being of sheet metal and adapted to die forming; a shaft; a flange on the end of said shaft; three pivots on said flange; a roller on each pivot, each roller having a spherical bearing surface, each roller being disposed in a longitudinal groove aforesaid, and the diameter of the spherical bearing surface being equal to the width of the groove; the outer surface of each roller being a segment of a sphere with center on the central axis aforesaid; and said outer surface of each roller being adjacent to the middle of a groove aforesaid.

9. A shaft coupling comprising three pairs of parallel walls, said pairs of parallel walls spaced 120 degrees apart about an axis of rotation and parallel thereto; transverse walls at the ends of said casing connecting said parallel walls; a shaft; a flange on the end of said shaft; three pivots on said flange spaced 120 degrees apart and being disposed between the pairs of parallel walls aforesaid; rollers having spherical bearing surfaces on said pivots; means to hold said rollers from radial movement; said coupling being balanced about said axis of rotation, being symmetrical on forward and backward drive, and being of rigid materials throughout, with small clearances between moving parts.

JOHN W. KITTREDGE.